J. FARLEY.
ADVERTISING APPLIANCE.
APPLICATION FILED MAY 27, 1911.

1,058,853.

Patented Apr. 15, 1913.

3 SHEETS—SHEET 1.

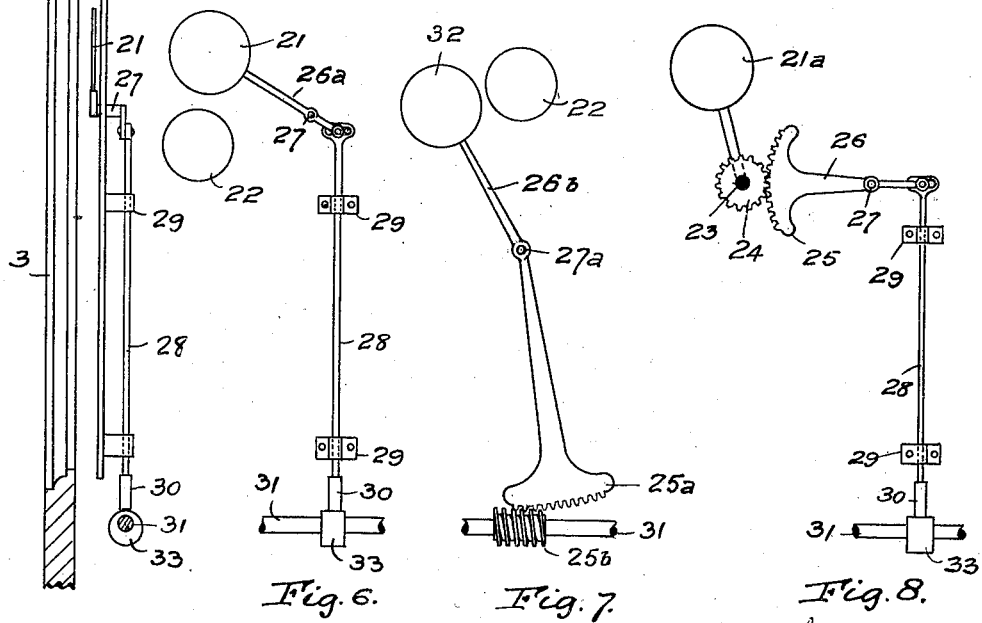

J. FARLEY.
ADVERTISING APPLIANCE.
APPLICATION FILED MAY 27, 1911.

1,058,853.

Patented Apr. 15, 1913.

3 SHEETS—SHEET 3.

Witnesses:
L. A. Sands.
L. C. Barkley.

Inventor:
John Farley,
by Franks Ackerman

COLUMBIA PLANOGRAPH CO., WASHINGTON, D. C.

UNITED STATES PATENT OFFICE.

JOHN FARLEY, OF LISCARD, ENGLAND.

ADVERTISING APPLIANCE.

1,058,853.      Specification of Letters Patent.      Patented Apr. 15, 1913.

Application filed May 27, 1911. Serial No. 629,930.

*To all whom it may concern:*

Be it known that I, JOHN FARLEY, a subject of the King of Great Britain, and a resident of Liscard, in the county of Cheshire, England, have invented certain new and useful Improvements in Advertising Appliances, of which the following is a specification.

This invention relates to improvements in advertising appliances of that kind in which a series of moving frames are adapted to be brought successively to a display opening and after exhibition to be returned to the rear of the series.

The features of the present invention consist in arranging the movable frames in upper and lower banks continuously being fed forward and backward by chains, a separately operated chain being adapted to lift and lower the frames from the upper to the lower bank and vice versa.

Further features of the invention consist in means for operating movable devices on the frames whenever they come into the display position.

Figure 1:
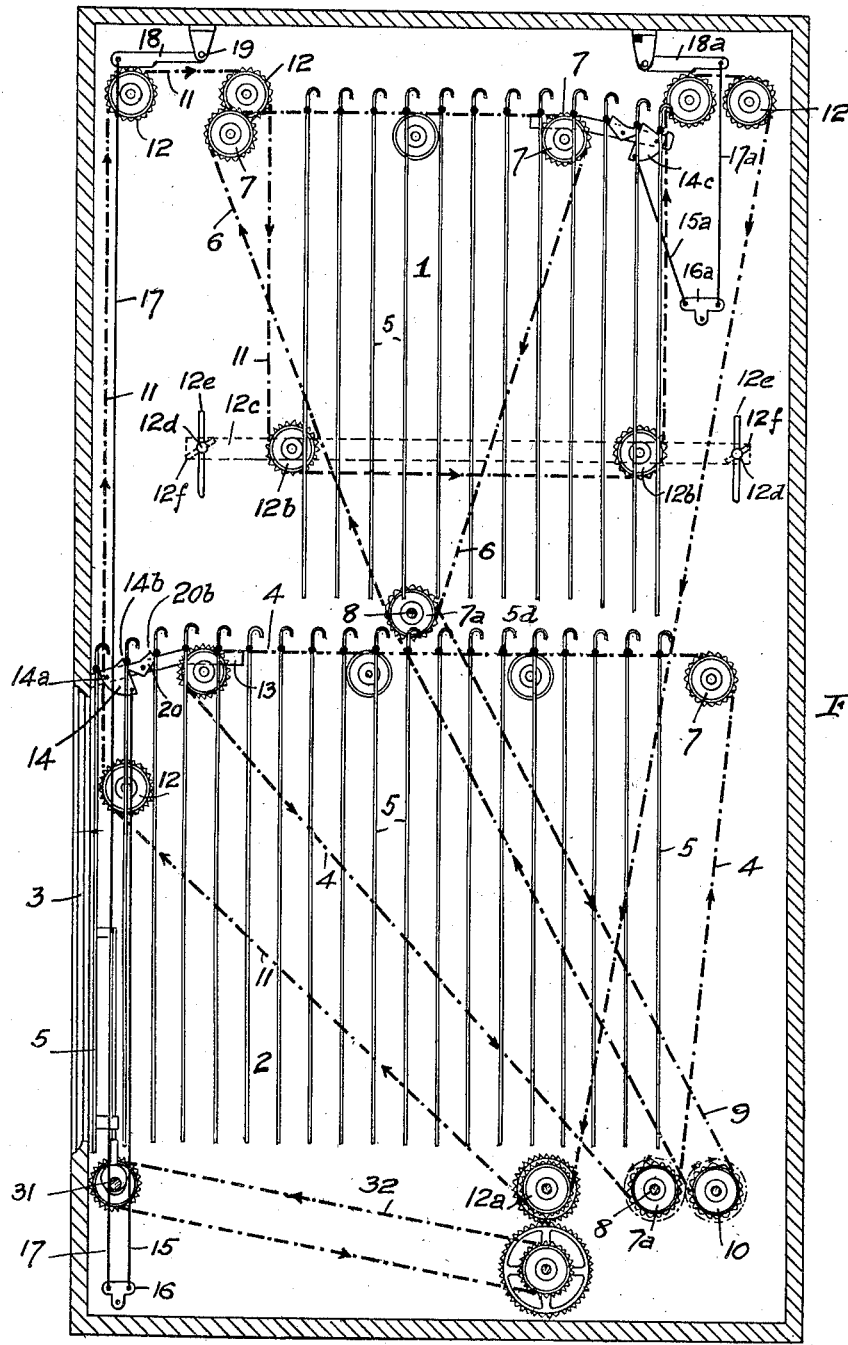
Figure 9:
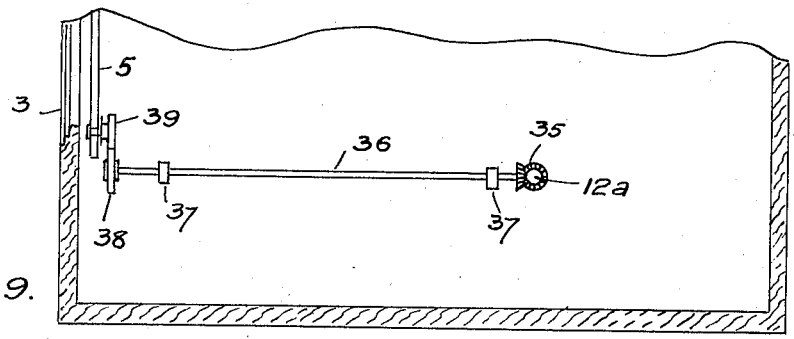
Figure 10:
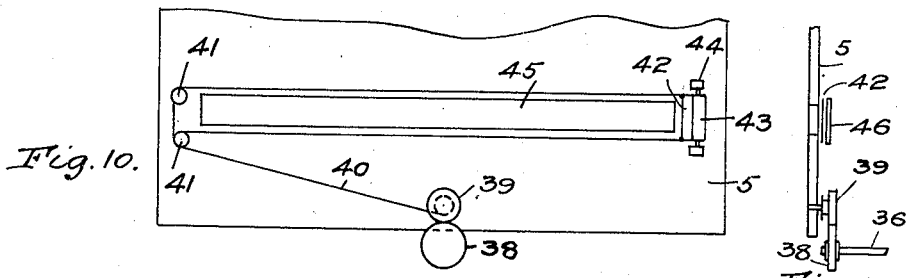
Figure 11:
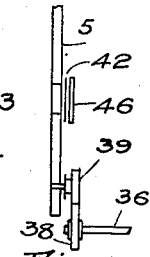
Figure 12:
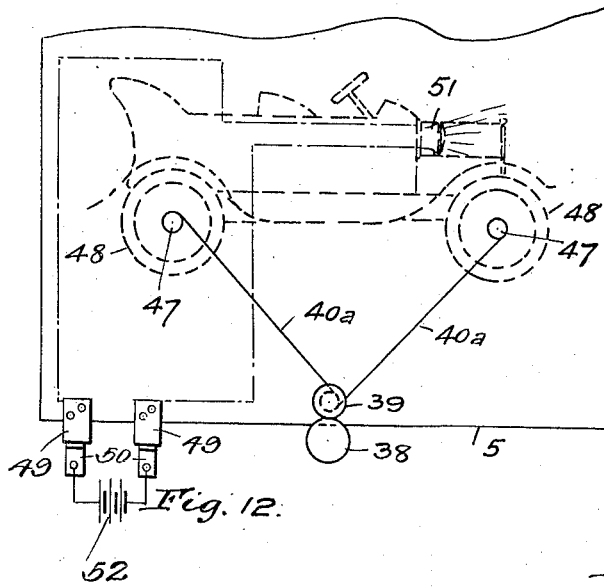
Figure 13:
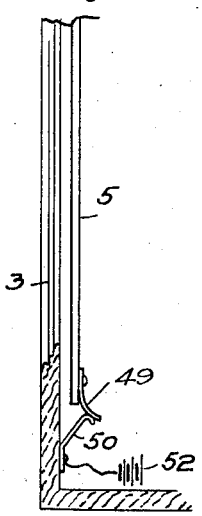

The invention is illustrated in the accompanying drawings, in which,

Figure 1. is a vertical section through an advertising appliance showing the means adopted for displaying the frames in rotation in the machine, the chain drives for effecting this movement being indicated diagrammatically by chain dotted lines. Fig. 2. is a fragmentary view on an enlarged scale showing the arrangement for actuating the movable devices on the frames. Fig. 3. is a fragmentary front view showing the manner in which the hooked projections on the frame engage with studs on the chain. Fig. 4. is a detail of an adjustable foot for the thrust rod of the movable devices. Fig. 5. shows various forms of cams suitable for actuating said devices. Figs. 6, 7, and 8, show various types of movements on the advertising frames. Fig. 9. is a detail section corresponding to the lower part of Fig. 1. showing a modified method of operating the movable devices. Figs. 10. and 11. are rear and side views of an application of the mechanism shown in Fig. 9. Fig. 12. shows a further application of the mechanism, and Fig. 13. illustrates an electrical connection operated by the fall of the frame.

The advertising frames are disposed in upper and lower banks, 1 and 2 respectively, the lower bank 2 being moved transversely across the machine toward the display opening 3 by a feeding chain 4 disposed in triangular fashion, the upper horizontal side $4^a$ of the triangle carrying the frames 5 forward toward the display opening 3, the projecting arms $5^a$, Fig. 3, resting on the chains. A similar feeding chain 6 controls the rearward movement of the frames in the upper series 1, the upper and lower triangularly disposed chains 4 and 6 pass over sprocket-wheels 7, $7^a$, a connecting chain 9 coupling the lower sprocket pulley $7^a$ of the upper chain with a separate sprocket pulley 10 geared to the shaft 8 of the sprocket pulley $7^a$ of the lower feeding chain 4, in such manner, that the directions of movement of the upper and lower chains are reversed. The main operating chain 11, the movement of which is independent of the feeding chains, passes around sprocket and guide pulleys 12 disposed in the following manner:—The main driving pulley $12^a$ of the operating chain is geared by gear wheels on the exterior of the casing, not shown, to the sprocket pulley $7^a$ of the lower feeding chain which in turn is coupled to the connecting chain 9, in such manner, that the drive from the operating chain sprocket $12^a$ to the feeding chain sprocket $7^a$ is in about the proportion of 1 to 17. The operating chain 11 is fitted with projecting studs $13^a$ adapted to engage hooks $5^d$ on the frames and passes up the front of the machine, in such manner, as to lift the advertising frame $5^c$ from in front of the display opening 3 and deposit it on the horizontal stretch of the upper feeding chain 6, the direction of the operating chain 11 after the frame is deposited being then below the horizontal stretch of feeding chain 6 to lower guide pulleys $12^b$ from whence it passes vertically upward and engages with and lifts the then rearmost advertising frame in the upper set off the trip pawl $14^c$ then carrying the frame under a lever $18^a$ and over guide pulleys 12 and deposits it on to the horizontal stretch of the lower feeding chain 4. The guide pulleys $12^b$ are mounted upon a rod or the like $12^c$ provided with studs $12^d$ working in slots $12^e$ and fitted with wing nuts $12^f$, so that any slack which develops in the operating chain 11 may be taken up by adjustment of the bar 12ᶜ in the slots.

The operating chain after depositing the frame on the lower feeding chain continues down to the main driving sprocket 12ᵃ at the base of the machine leaving the advertising frame to be fed forward toward the display opening 3 by the lower feeding chains 4. In order to allow the operating chain 11 to easily lift the outermost advertising frame from in front of the display opening 3 by keeping off the succeeding frames from pressing against this outermost frame, the following device is arranged: On the inclined race 13 to which the advertising frames are delivered by the lower feeding chain, is pivoted at 14ᵃ a trip pawl 14, an operating cord, rod, or the like 15 is carried down from this pawl to a rocking lever 16 pivoted at the base of the machine and from the other end of this rocking lever a connecting cord or rod 17 is carried to a trigger mechanism consisting of a lever 18 pivoted at 19 near the top of the machine. As the studs on the operating chains carrying up an advertising frame encounter this trigger lever, it is deflected upward and the connecting rods or cords 15 17, are operated through the medium of the lower rocking lever, and the pawl 14 is drawn down. This pawl 14 is provided with an oblique abutment 14ᵇ which normally stands above the lever of the inclined race 13, and will therefore arrest the arms 5ᵃ of the frame. A second trip pawl 20 is also pivoted on the race 13 immediately in front of the pawl 14, and has a similar upstanding abutment 20ᵇ. As a frame is delivered on to the race 13, it depresses the abutment 20ᵇ, by bearing against and riding over the oblique face thereof when the pawl 20 is free from the next frame 5 in rear, and passes on to the rear portion of the pawl 20 beyond the pivot, being there arrested by the oblique face of the abutment 14ᵇ on the second pawl. In this position the projection 5ᵃ is still resting on the pawl 20 and therefore prevents the succeeding frame from depressing the abutment 20ᵇ. The frame in this position 5 Fig. 2., cannot pass over the abutment 14ᵇ until the pawl 14 is oscillated about its pivot by the pull of the actuating cords or rods 15, 17, which occurs when the front frame 5 has been carried around the upper wheel 12, and has lifted the trigger 18. By this arrangement, therefore, succeeding frames are held off from pressing against the front display frame 5, the weight of which when on the outer tip of the pawl 14 also acts to keep the abutment 20ᵇ up, and hold off the next frame; the front frame 5ᶜ can thus be lifted quite easily by the operating chain. The trip pawl 14ᶜ, Fig. 1, and lever 18ᵃ with their operating cords 15ᵃ, 17ᵃ, and rocking lever 16ᵃ, act to hold back and release succeeding frames one by one at the rear of the banks in a similar manner to the analogous trip device previously described for regulating the fall of the frames toward the front display opening 3.

The advertising frames 5 Figs. 1. and 2. are provided with pivoted movable devices 21, 21ᵃ, which may be the part of a figure or a screen adapted to move in front of an orifice 22 behind which a price is disclosed. On the pivot 23 of the movable part 21ᵃ, in one form of the apparatus, a pinion 24 is mounted which gears with a toothed sector 25 fitted at the end of a lever 26 pivoted at 27, the other end of the lever being connected by a thrust rod 28 carried in bearings 29 to an adjustable thrusting block 30 which is guided in and projects below the edge of the advertising frame 5. The adjustable thrusting block is illustrated in Fig. 4. and consists of a shoe piece 28ᵃ sliding on the rod 28 and adapted to be gripped in any desired position thereon by the screw 28ᵇ. In this way the length of the rod may be adjusted as required.

In the case of the movable screen 21 Fig. 6., the latter is fitted at one end of the pivoted lever 26ᵃ, the other end being connected to a thrust rod 28. The series of advertising frames 5 are each provided with either a geared sector and pinion arrangement 25, 24, for operating a shutter 21ᵃ or a simple lever operated shutter as described, the thrust blocks of the series extending below the lower edges of the frames. Mounted below the lower edge of the front frame when in position, is a rotating shaft 31 journaled in the casing of the appliance and driven by chain gearing 32 from the main driving shaft of the apparatus or otherwise. The rotating shaft is provided with a series of operating elements such as cam wheels 33, 33′ or stars 33ᵃ of various shapes, Fig. 5., which are adapted to engage and lift the thrust blocks 30 on the advertising frames. By making the contour of the cams of different configuration, various movements may be imparted to the thrust rods, and consequently, in the case of moving figures, to the movable parts thereof. It is intended that there should be only one, or perhaps two, thrust rods to each frame, but differently placed, and consequently though all the cams on the shaft are continually rotating only those that are under the particular thrust rods of the then front frame are in operation.

In the further modification shown in Fig. 7., the screen 32 or other movable object is mounted on a lever 26ᵇ pivoted at 27ᵃ to the frame, the lever 26ᵇ being fitted with a geared sector 25ᵃ and adapted to be operated by the worm 25ᵇ on the shaft 31. In this way a sidewise movement may be imparted to a movable object on the frame, the geared sector 25ª only coming into contact with the worm 25ᵇ when the frame is in its display position.

In the arrangement shown in Figs. 9. to 12. the movable devices on the frames are driven from the main shaft 12ª and bevel wheels 35 through a transverse shaft 36 carried in bearings 37, the end of the shaft being fitted with a friction wheel 38 which is adapted, when a frame 5 falls into position, to engage frictionally and drive a winding drum 39 pivoted on the frame. In the modified arrangement shown in Fig. 10. cords 40 are led from this winding drum around guide pulleys 41 and connected to the end 42 of a pull-out device in the manner of a spring roller blind carried in pivots 44 on the frame 5. When the frame falls into position the winding drum 39 is then driven from the disk 38 and the blind 42 drawn in front of an opening 45 in the frame so as to mask it. Behind this opening 45 may be mounted a plate 46 carrying advertising matter which will be covered by the winding action of the drum 39, and uncovered when the latter is released from contact with the disk 38 when the frame lifts. The cords 40ª may be rewound on the axles 47, when the drum leaves the friction roller, by means of a volute spring (not shown) fixed to the frame and to each of the axles 47, so that the spring takes up the slack of the cord. In the further modification shown in Fig. 12. the cords 40ª from the winding drum 39 are wound on to the hubs 47 of the wheels 48 of a motor car device printed or mounted on the frame 5, the wheels being separate fittings and pivoted on the frame. When the latter falls into position the drum 39 is actuated and the wheels 48 caused to spin around. As the frame 5, Fig. 13., falls into position the electrical contacts 49, 50, the contact 49 being on the frame 5 and that 50 on the casing of the machine, are closed and an electrical circuit from the supply 52 caused to pass through the advertisement. This arrangement may be utilized for instance to illuminate the head lamps 51 which may be provided on the motor car advertising device shown in Fig. 12.

I claim—

1. An advertising appliance comprising, a series of movable frames arranged in upper and lower banks; traveling feed chains engaging the frames and adapted to move the banks along continuously; movable figures or devices on the frames; a continuously rotating shaft associated with the casing; operating elements on the shaft; and means associated with said operating elements and adapted to be operated thereby for actuating the movable devices only when each frame is in its display position.

2. An advertising appliance comprising, a series of movable frames arranged in upper and lower banks; traveling feed chains engaging the frames and adapted to move the banks along continuously; a winding drum on the frames; movable devices on the frames, cords passing from the drum to the movable devices, a continuously rotating shaft fixed to the casing; a disk on the shaft adapted to make frictional contact with and operate the drum only when a frame is in its display position; and a separate operating chain adapted to lift each frame in rotation from one bank and deposit it in the other.

In testimony whereof I affix my signature in presence of two witnesses.

JOHN FARLEY.

Witnesses:
    A. J. Davis,
    B. Knight.

---

Copies of this patent may be obtained for five cents each, by addressing the "Commissioner of Patents, Washington, D. C."